United States Patent
Obrecht

(10) Patent No.: US 9,638,169 B2
(45) Date of Patent: May 2, 2017

(54) METHOD FOR SETTING A PITCH REFERENCE POINT FOR A WIND TURBINE BLADE ON A ROTOR

(71) Applicant: Siemens Aktiengesellschaft, München (DE)

(72) Inventor: John M. Obrecht, Louisville, CO (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 587 days.

(21) Appl. No.: 14/183,567

(22) Filed: Feb. 19, 2014

(65) Prior Publication Data

US 2015/0233350 A1    Aug. 20, 2015

(51) Int. Cl.
F03D 7/02          (2006.01)
(52) U.S. Cl.
CPC ................... F03D 7/0224 (2013.01)
(58) Field of Classification Search
CPC .................................................. F03D 7/0224
See application file for complete search history.

(56) References Cited

U.S. PATENT DOCUMENTS

| | | | |
|---|---|---|---|
| 8,100,660 B2 | 1/2012 | Vronsky et al. | |
| 8,161,822 B2 | 4/2012 | Volanthen | |
| 2009/0263246 A1* | 10/2009 | Bolz | F03D 7/042 416/61 |
| 2010/0092292 A1 | 4/2010 | Nies et al. | |
| 2011/0135469 A1 | 6/2011 | Scholte-Wassink | |
| 2011/0182730 A1 | 7/2011 | Link | |
| 2011/0227342 A1 | 9/2011 | Danielsen | |
| 2013/0121825 A1 | 5/2013 | Miranda | |

FOREIGN PATENT DOCUMENTS

EP        2615303 A1        7/2013

* cited by examiner

*Primary Examiner* — Moshe Wilensky

(57) ABSTRACT

A wind turbine blade (22) is cantilevered from a shaft (50) of a rotor (20). A pitch reference azimuth (74) of the blade may be located by generating a function (66, 67, 68, 69) of gravitational bending strain or moment magnitude of the blade versus pitch angle of the blade for a vector component (85, 86) of gravitational force (GF) relative to a predetermined transverse line (CL, 83) of the blade, such as a chord line, over a range of pitch angles of the blade. The pitch reference azimuth may be set at a characteristic point (70, 71, 72) on the function, such as an inflection point Two such functions (67, 69) may be generated with the blade in two respective positions on opposite sides of the rotor The intersection point (73) of these functions is a pitch reference point that is compensated for rotor tilt.

14 Claims, 4 Drawing Sheets

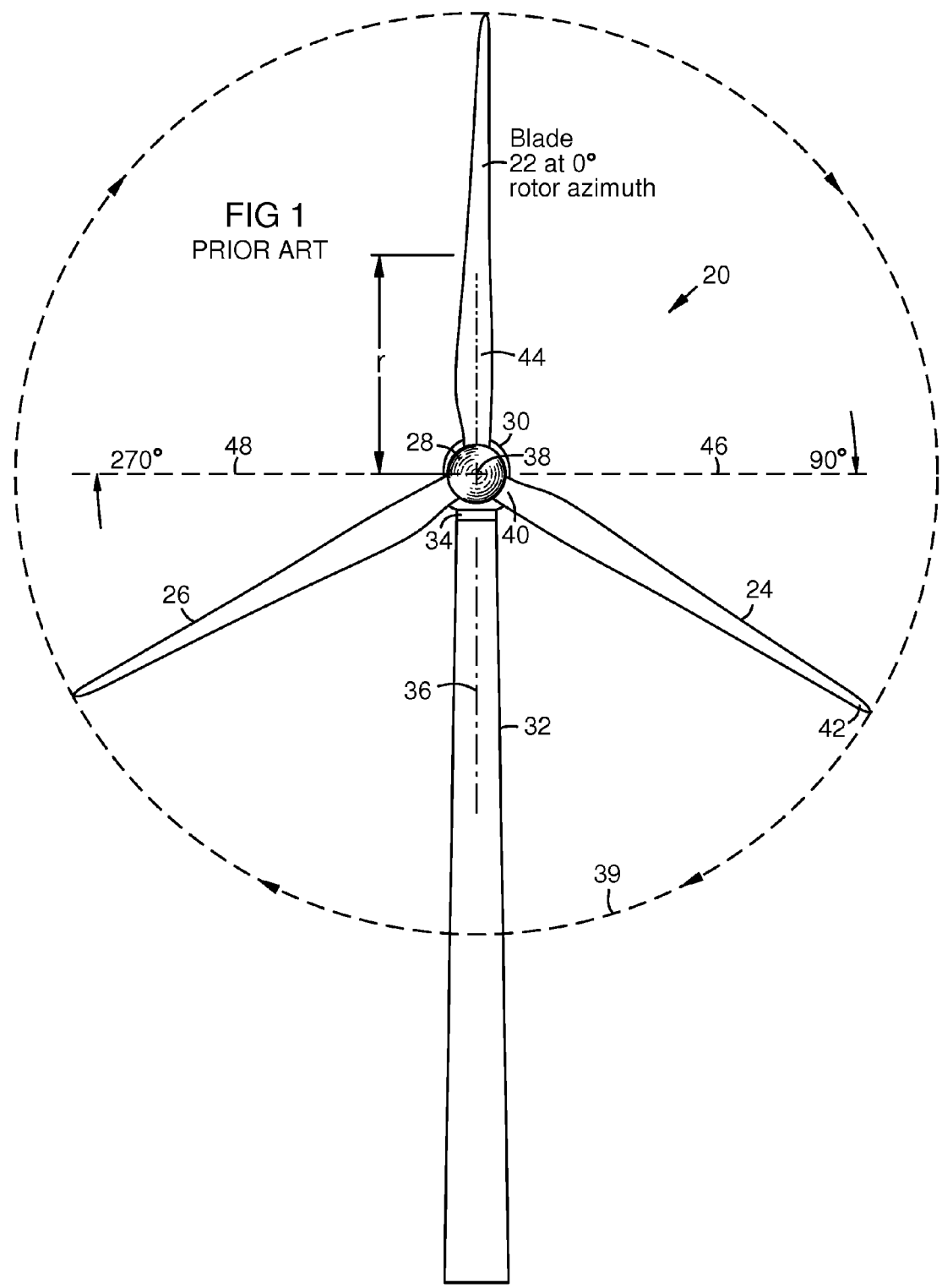

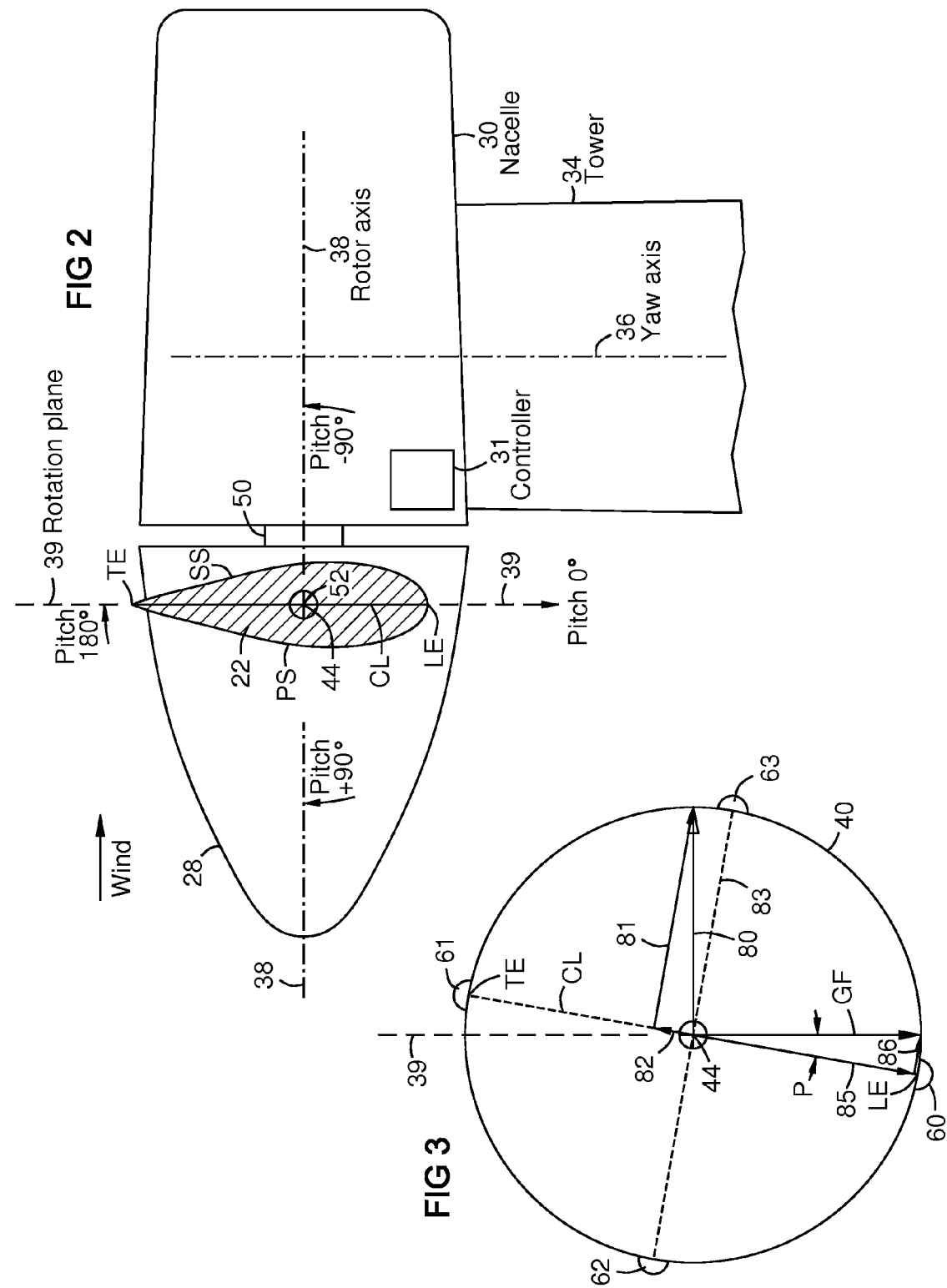

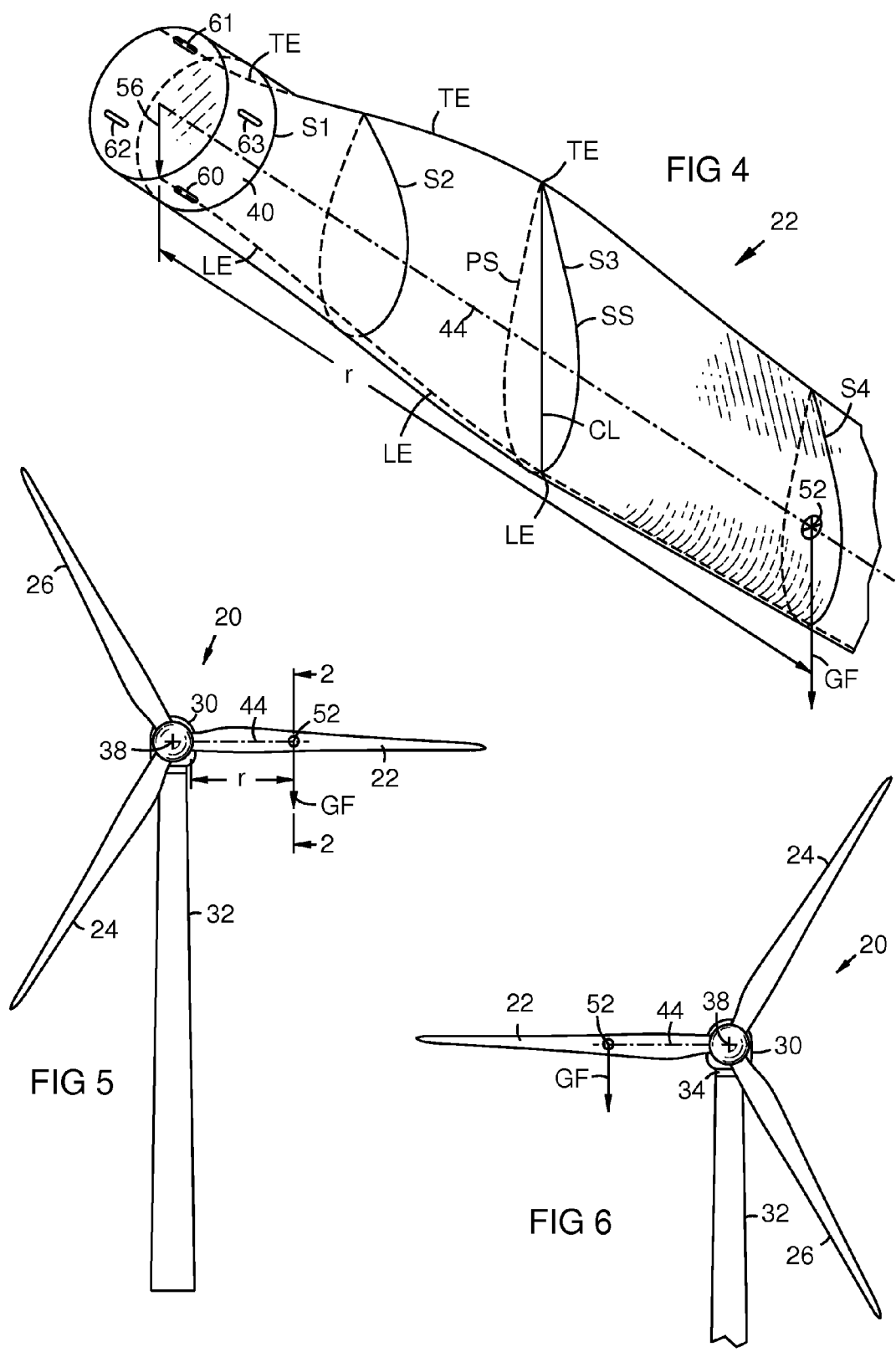

METHOD FOR SETTING A PITCH REFERENCE POINT FOR A WIND TURBINE BLADE ON A ROTOR

FIELD OF THE INVENTION

The invention relates to pitch control of wind turbine blades, and particularly to establishing a pitch reference point for a wind turbine blade after installation.

BACKGROUND OF THE INVENTION

Modern wind turbines actively optimize the pitch of the blades for each operational situation A pitch reference position must be established for each blade geometry based on a selected aerodynamic or structural characteristic of the blade, such as a chord line or zero lift line. Zero pitch commonly means that the chord line at a given radial position on the blade, such as at the tip, aligns with the rotation plane of the blade with the leading edge forward The pitch control system must know the exact pitch azimuth of the blade as a reference in order to accurately optimize pitch Setting the pitch reference point is done during the installation of the turbine. Currently there is no fast and reliable way to do this, and errors may occur

BRIEF DESCRIPTION OF THE DRAWINGS

The invention is explained in the following description in view of the drawings that show FIG. 1 is a front view, or pressure side view, of a conventional wind turbine with a first blade in a vertical position, which is considered as zero rotor azimuth.

FIG. 2 is a sectional view of a horizontal blade at 90° rotor azimuth taken along line 2-2 of FIG. 5

FIG. 3 is a schematic transverse sectional view of a blade root, showing cantilever forces and moments therein FIG. 4 is a partial perspective view of a blade at the 90° rotor azimuth position with leading edge down.

FIG. 5 is a front view of a wind turbine with a blade at the 90° rotor azimuth with leading edge down FIG. 6 is a front view of a wind turbine with a blade positioned at the 270° rotor azimuth with leading edge up

DETAILED DESCRIPTION OF THE INVENTION

Figure 7:
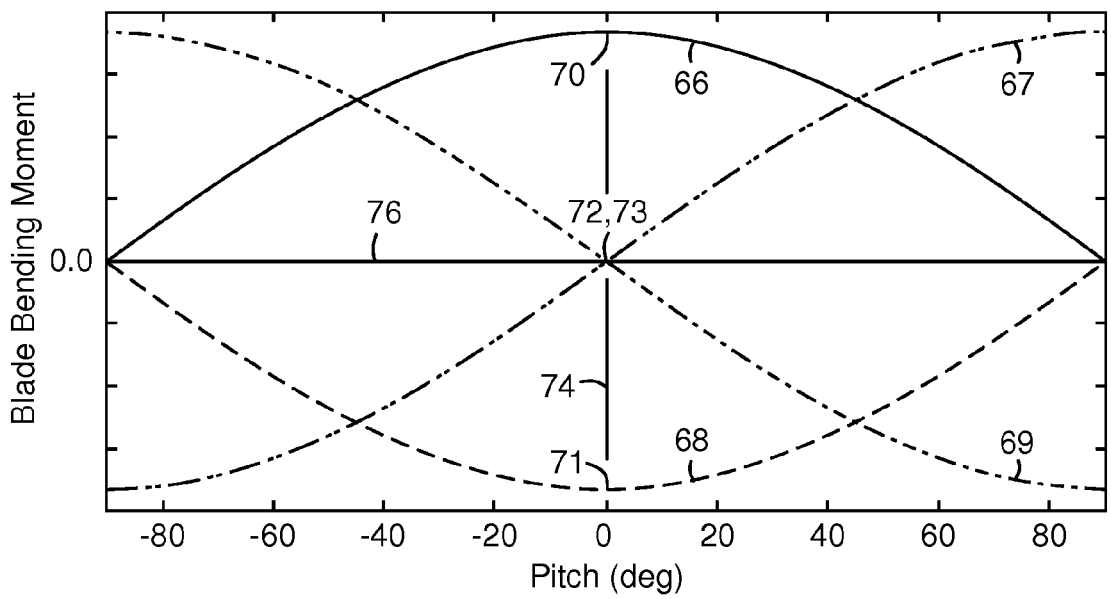
FIG. 7 is a graph of root bending moment as a function of pitch with zero rotor tilt

FIG. 1 is a front view of a wind turbine (WT) 20, with three blades 22, 24, 26 mounted radially to a hub 28, which is mounted on a rotor shaft (not visible) extending from a nacelle 30, which is mounted on a tower 32 via a yaw bearing 34 that provides rotation of the nacelle about a yaw axis 36 The blades, hub, and shaft constitute a rotor that rotates about a horizontal rotor shaft axis 38. The blades rotate in a rotation plane 39. A radial distance r on a given blade is indicated Each blade has a radially inner or proximal root 40 attached to the hub, and a radially outer or distal tip 42 Each blade pivots controllably about a respective pitch axis 44. The vertical blade 22 is shown in the zero rotor azimuth position. Also shown is a rotor azimuth position 46 of 90° and a position 48 of 270°

FIG. 2 is a sectional view of a horizontal blade 22 taken along line 2-2 of FIG. 5. The blade is radially mounted on a hub 28 on a horizontal rotor shaft 50, which drives a generator (not shown) in the nacelle 30. A controller 31 in the nacelle or elsewhere may control blade pitch via pitch actuators (not shown) in the hub 28. It may also control other rotor functions such as braking, rotor azimuth positioning, and yaw positioning The blade rotates in a rotation plane 39. The blade pivots about a pitch axis 44, which may pass through the blade center of mass 52 Alternately the pitch axis may miss the center of gravity Typically the pitch axis is defined as passing through the center of the blade root and extending in a straight line normal to the root face plane. In this figure, the airfoil chord line CL is aligned with the rotation plane 39 This illustrates a zero pitch condition relative to the chord line at the given radial position. The pitch sign convention is positive toward the feather position (blade rotating clockwise in this view), although this is not a requirement of the invention FIG. 3 is a schematic transverse sectional view of the blade root 40 It illustrates vector decomposition of bending moment 80 for a horizontal blade in cantilever equilibrium with 10° of pitch angle P measured between a chord line CL and the rotation plane 39 Although the force of gravity (gravitational acceleration times blade mass) is a distributed force, it may be treated at the root of the blade as a resultant force vector acting through the blade center of gravity. Bending moment 80 is the moment of force of the internal stress couple in the root that results from the gravitational force GF acting at radius r (FIG. 4). The internal stress couple in the root section that results from gravity defines a bending plane in the root, which may be called "edgewise" when it is parallel to the chord line CL, and "flapwise" when normal to the chord line The bending moment 80 is decomposed into vectors 81 and 82, which represent the relative magnitudes of the bending moment 80 in a bending plane perpendicular to or parallel to the chord line CL, respectively Although the concept of a bending plane is useful, the bending moment vectors 80, 81, 82 as viewed in the transverse root section of FIG. 3 can also be simply described as resulting from gravitational force GF that is either parallel to a selected transverse line of the blade or to a transverse perpendicular thereof The gravitational force vector GF may be decomposed into a first component 85 aligned with or parallel to a selected transverse line such as the chord line CL, and a second vector component 86 in a perpendicular transverse direction. One or more strain gauges 60-63, may be mounted in or on the blade or root in a configuration that directly senses the vector strain magnitudes relative to the desired transverse lines, or the strain vectors and derived bending moment vectors may be computed from existing strain gauges at other locations In the exemplary configuration as shown, a tensile strain gauge 61 on the trailing edge TE side of the root may provide the relative magnitude of vector 85 along the chord line CL, while gauge 62 provides the relative magnitude of vector 86 parallel to line 83. Additional gauges 60, 63 may provide corresponding tensile strain indications when the leading edge is pitched upward as later explained. Such strain gauges may be located anywhere along the desired transverse lines except at the cantilever neutral axis. For example, they may be located on or in the surface of the root at one or both ends of a selected transverse line CL and/or at one or both ends of a perpendicular transverse line 83. However, the strain gauges may be located anywhere, as long as their pitch azimuth relationship to the desired transverse line is known There are many different types of strain gauges, and the invention is not limited to a particular type The drawings herein show airfoil sections that are symmetric about the chord line, and a pitch axis that passes through the center of gravity of the blade These are simplified views for clarity, and are not a requirement of the invention. Any transverse line or bending plane of the root can be selected for vector analysis as later described. The blade may be cambered, swept forward or backward, its center of gravity may be offset from the pitch axis, the rotor shaft may be tilted, and/or the blades may be coned (the pitch axis is not perpendicular to the shaft). In any configuration, a transverse line or bending plane of the root may be selected as a pitch reference point, for example by locating a strain gauge on one or both sides of the root at position(s) on that transverse line or plane The selected line need not be aligned with, or perpendicular to, the chord line It can be any transverse line, such as a zero lift line or maximum rigidity line of the blade. With a twisted blade, the chord lines at all radial positions are not in the same plane However, a chord line at a given radial position may be selected, such as a chord line at the blade tip or at the blade center of gravity.

FIG. 4 is a partial perspective view of a blade 22 in a cantilever position at 90° of rotor azimuth as shown in FIGS. 2 and 5 with the leading edge LE downward. Exemplary transverse sectional airfoil profiles S1, S2, S3, and S4 of the blade are shown. The root 40 may have a cylindrical shape as shown The pitch axis 44 may coincide with the cylinder axis of the root portion 40, and may pass through the blade center of mass 52, although these are not requirements The effect of gravity may be considered a resultant force vector GF acting through the center of gravity 52 of the blade, creating a bending moment on the root 40 with arm r.

A function may be generated of gravitational bending moment magnitude of the blade versus blade pitch angle for the vector component of gravitational force relative to a selected transverse line of the blade over a range of pitch angles of the blade. Generating such bending moments over one or more ranges of pitch angles provides the bending moment relative to the selected transverse line as a function of pitch, which can be used to determine an accurate pitch azimuth, such as zero pitch with respect to the chord line CL or any other chosen transverse line FIG. 5 shows a wind turbine with a blade 22 positioned at the 90° rotor azimuth with its leading edge down. If this blade is pitched through 360° of pitch azimuth, the root bending magnitude can be generated with respect to any selected transverse line The inventor recognized that a strain sensor configuration on the blade can provide a strain or bending moment curve with respect to the selected transverse line of the blade, and therefore can be used to calibrate the pitch controller to the blade structure.

FIG. 6 shows the turbine rotor 20 rotated so that the blade 22 is positioned at the 270° rotor azimuth with the trailing edge down The inventor recognized that rotating the pitch through a range such as 180° at the 90° rotor azimuth position of FIG. 5, and then rotating the pitch through the same pitch range in the position of FIG. 6 has advantages over rotating the pitch through 360° in only a single rotor position for reasons later explained.

FIG. 7 shows a graph of root bending moment as a function of pitch in two perpendicular transverse directions generated over 180° of pitch (−90° to +90°) as follows.

66—Rotor azimuth 90°, relative bending magnitude in chordwise pitch azimuth

67—Rotor azimuth 90°, relative magnitude in pitch azimuth normal to chord

68—Rotor azimuth 270°, relative bending magnitude in chordwise pitch azimuth

69—Rotor azimuth 270°, relative magnitude in pitch azimuth normal to chord

A pitch reference point 74 can be determined by one or more characteristics of one or more of the curves 66-69 For example a zero pitch reference point with respect to the chord line in this example can be established at the maximum 70 of curve 66, or the minimum 71 of curve 68, or the inflection point 72 of either curve 67 or 69, or the intersection 73 of curves 67 and 69 This figure represents a symmetric airfoil with the pitch axis passing through the center of mass, although this is not a requirement of all embodiments of the invention In this configuration, the inflection points 72 of curves 67 and 69 coincide with their intersection point 73, and the maximum 70 of curve 66 and the minimum 71 of curve 68 occur at the same pitch angle 74 The pitch angle 74 is the unknown to be determined by these curves. In this example, a pitch angle value of zero, as shown, may be set in the controller using one or more of the above characteristic points on the function curves, using a horizontal blade at either 90° or 270° rotor azimuth. Therefore, only one of the curves 66, 67, 68, 69 is needed However, it is beneficial to consider at least two of the curves, especially curves 67 and 69, to compensate for rotor tilt as next described.

Figure 8:
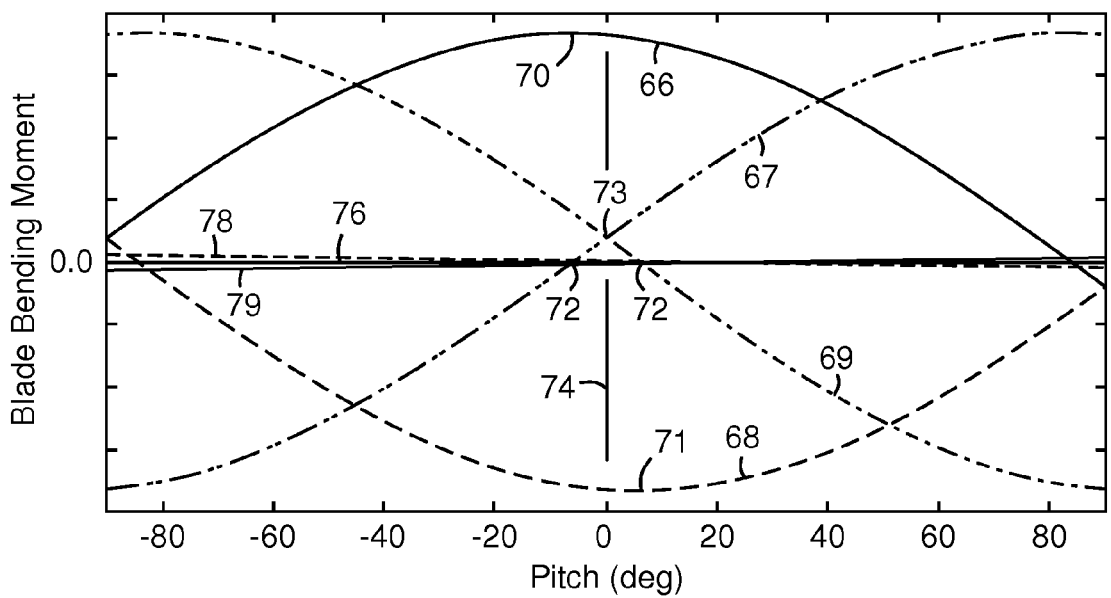
FIG. 8 is a graph of root bending moment as a function of pitch with 6° rotor tilt and the blade center of gravity offset from the pitch axis

FIG. 8 shows the effect of 6° tilt of the rotor shaft, meaning the rotor shaft is not horizontal In this example, the function curves 66, 67 for the blade at 90° rotor azimuth are offset leftward when compared to FIG. 7, and the curves 68, 69 for the blade at 270° rotor azimuth are offset rightward These shifts cause the curves 67 and 69 to intersect 73 not on the zero moment line 76 and not at their inflection points 72. However, since curves 67 and 69 are taken on opposite sides of the rotor, their opposite shifts compensate each other at their intersection 73, causing it to occur along the same pitch reference line 74 as the untilted rotor of FIG. 7, resulting in compensation for tilting For this reason, it is beneficial in some embodiments to generate at least curves 67 and 69 for blade positions at both 90° and 270° rotor azimuth, whether or not rotor tilt is expected FIGS. 7 and 8 can alternately represent bending strain magnitudes of the blade versus pitch angle of the blade for a vector component of gravitational force aligned with or parallel to a predetermined transverse line of the blade over a range of pitch angles of the blade Strain does not need to be converted into moment for the calibration method herein Twisting moments 78, 79 occur if the blade center of mass is offset from the pitch axis However, the effect on the pitch point 74 of intersection 73 is negligible If the blades are coned (the pitch axis is not perpendicular to the rotor shaft) and the shaft is tilted, then the blades will not be perfectly horizontal at 90° and 270° of rotor azimuth. In this situation, rotor azimuths other than 90° and 270° can be selected that provide horizontal blade positions on tilted and coned rotors if desired However, the blade does not need to be perfectly horizontal for correct calibration The calibration is insensitive to small)(±3°) variations of the blade from horizontal, and the variations caused by tilt cancel each other on opposite sides of the rotor when using the intersection point of functions 67, 69 If the strain sensor configuration is identically placed on each blade of a rotor, then the blades will have consistent pitch reference points The reference point or azimuth line 74 may be any pitch azimuth, as long as the pitch controller is programmed accordingly For example, a 90° pitch azimuth may be established at the zero moment point of either curve 66 or 68 in FIG. 7 or at the intersection point of these curves in FIG. 7 or 8 Alternately, those points may represent any desired reference pitch depending on the strain sensor configuration, from which reference point the controller can easily determine a zero pitch point This allows high flexibility in the placement of strain sensors on the blade Although the blade root may be a convenient location for strain gauges and for the vector decomposition functions, the gauges may be located elsewhere on the blade For example, if strain gauges are located at mid-span, they can provide bending strain and moment vectors for the radially outer half of the blade, which may be used for the present calibration method.

In lieu of rotating the turbine rotor shaft after generating curve 67 in order to generate curve 69, an embodiment of the invention contemplates generating the two functions (curves) of gravitational bending moment magnitude of the blade versus pitch angle of the blade for a vector component of gravitational force relative to a predetermined transverse line of the blade over two ranges of pitch angles of the blade that are 180 degrees offset from each other, for example leading edge down then trailing edge down The pitch reference angle of the blade may then be set at an intersection of these two functions It is expected that the first derivative of the function near the zero value would be much lower (i e a flatter curve) for the trailing edge down function than for the leading edge down function, thereby suggesting that it may be easier to define the reference value for the leading edge down embodiment The present method may be fully encoded in program logic in the controller 31, which can then automatically perform all of the method steps automatically, for example as one of the first rotor operations after assembly and installation of the rotor on the tower Thus, the controller can calibrate itself to the installed blades.

While various embodiments of the present invention have been shown and described herein, it will be obvious that such embodiments are provided by way of example only Numerous variations, changes and substitutions may be made without departing from the invention herein. Accordingly, it is intended that the invention be limited only by the spirit and scope of the appended claims.

The invention claimed is:

1. A calibration method for setting a pitch reference point of a wind turbine blade installed on a wind turbine rotor, comprising:
    disposing the blade in a first cantilevered position wherein a root of the blade is attached to a shaft of the rotor;
    generating a first function of a gravitational bending moment magnitude of the blade versus a pitch angle of the blade for a vector component of gravitational force relative to a predetermined transverse line of the blade over a first range of pitch angles of the blade;
    disposing the blade in a second cantilevered position on an opposite side of the rotor from the first cantilevered position;
    generating a second function of the gravitational bending moment magnitude of the blade versus the pitch angle of the blade for a vector component of gravitational force relative to the predetermined transverse line of the blade over the first range of pitch angles of the blade or a second range of pitch angles of the blade that is 180 degrees offset from the first range of pitch angles;
    setting the pitch reference of the blade at an intersection of the first and second functions for rotation; and
    calibrating a pitch controller to the wind turbine blade using the pitch reference of the blade set at the intersection of the first and second functions, operating the wind turbine blade, wherein the pitch is altered using the pitch reference set in previous steps.

2. The method of claim 1, wherein the characteristic point is a maximum, minimum, or inflection point of the first function.

3. The method of claim 1 wherein the first cantilevered position is at 90 degrees of rotor azimuth and the second cantilevered position is at 270 degrees of rotor azimuth, wherein zero degrees of rotor azimuth is vertically upward from the shaft.

4. The method of claim 1, wherein the predetermined transverse line is a maximum rigidity line of the blade or a perpendicular line thereto, and the vector component is aligned with or parallel to the predetermined transverse line as seen in a transverse section of the blade root.

5. The method of claim 1, wherein the predetermined transverse line is a chord line of the blade or a perpendicular line thereto at a given radial position on the blade, and the vector component is aligned with or parallel to the predetermined transverse line as seen in a transverse section of the blade root.

6. The method of claim 1, wherein the predetermined transverse line is a zero lift line of the blade or a perpendicular line thereto, and the vector component is aligned with or parallel to the predetermined transverse line as seen in a transverse section of the blade root.

7. The method of claim 1, further comprising:
    providing a strain sensor configuration on the blade that provides an indication of a first gravitational bending strain at a position on the predetermined transverse line as viewed in a transverse section of the root, and deriving the bending moment magnitude for said first function from said indication.

8. The method of claim 1, further comprising:
    providing first and second strain sensors on the root at opposite ends of the predetermined transverse line as seen in a transverse section of the root, and deriving the bending moment magnitudes for said first and second functions from indications from said first and second strain sensors.

9. A calibration method for setting a pitch reference point of a wind turbine blade installed on a wind turbine rotor, comprising:
    disposing the blade in a first horizontal cantilevered position wherein a root of the blade is attached to a shaft of the rotor;
    generating a first function of a gravitational bending strain magnitude or bending moment magnitude of the blade versus a pitch angle of the blade for a vector component of gravitational force aligned with or parallel to a predetermined transverse line of the blade over a first range of pitch azimuths of the blade;
    disposing the blade in a second horizontal cantilevered position on an opposite side of the rotor from the first cantilevered position;
    generating a second function of the respective gravitational bending strain magnitude or bending moment magnitude of the blade versus the pitch angle of the blade for a vector component of gravitational force relative to the predetermined transverse line of the blade in a second pass over the first range of pitch angles of the blade or over a second range of pitch angles of the blade that is 180 degrees offset from the first range of pitch angles;
    setting a pitch reference azimuth of the blade at an intersection of the first and second functions for rotation; and calibrating a pitch controller to the wind turbine blade using the pitch reference of the blade set at the intersection of the first and second functions, operating the wind turbine blade, wherein the pitch is altered using the pitch reference point used in previous steps.

10. The method of claim 9, wherein the characteristic point is a maximum, a minimum, or an inflection point of the first function.

11. The method of claim 9, wherein the predetermined transverse line is a chord line of the blade or a perpendicular line thereto at a given radial position on the blade, and the vector component is aligned with or parallel to the predetermined transverse line as seen in a transverse section of the blade root.

12. The method of claim 9, further comprising:

providing a strain sensor configuration on the blade that provides an indication of the first gravitational bending strain at a position on the predetermined transverse line as viewed in a transverse section of the root.

13. A calibration method for setting a pitch reference point of a wind turbine blade installed on a wind turbine rotor, comprising:

generating a first function of gravitational bending versus pitch angle of the blade;

generating a second function of gravitational bending versus pitch angle of the blade; and establishing a pitch reference of the blade at an intersection of the first and second functions.

14. The method of claim 13, further comprising setting the pitch reference at a maximum, minimum, or inflection point of the function.

* * * * *